United States Patent
Saito et al.

(10) Patent No.: US 7,136,781 B2
(45) Date of Patent: Nov. 14, 2006

(54) COMPRESSOR REMOTE MONITORING SYSTEM

(75) Inventors: Takashi Saito, Tsuchiura (JP); Shinichi Hirose, Chiyoda (JP); Makoto Yamazaki, Iwama (JP); Seiji Tsuru, Tsuchiura (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 843 days.

(21) Appl. No.: 10/244,750

(22) Filed: Sep. 17, 2002

(65) Prior Publication Data

US 2003/0055534 A1    Mar. 20, 2003

(30) Foreign Application Priority Data

Sep. 17, 2001 (JP) ............................. 2001-280903

(51) Int. Cl.
*G06F 11/00* (2006.01)

(52) U.S. Cl. .................... 702/188; 702/56; 702/182; 702/183; 702/184; 702/185; 702/186; 702/187; 700/11

(58) Field of Classification Search ........ 702/182–188, 702/65; 700/11
See application file for complete search history.

(56) References Cited

U.S. PATENT DOCUMENTS 6,298,308 B1 * 10/2001 Reid et al. .................... 702/56

FOREIGN PATENT DOCUMENTS

| CN | 1087712 | 6/1994 |
|---|---|---|
| CN | 1302395 | 7/2001 |
| JP | A- 2001-141290 | 5/2001 |
| KR | 1997-17087 A | 4/1997 |

\* cited by examiner

*Primary Examiner*—Marc S. Hoff
*Assistant Examiner*—Phuong Huynh
(74) *Attorney, Agent, or Firm*—Antonelli, Terry, Stout and Kraus, LLP.

(57) ABSTRACT

In a system for monitoring each of compressors distant from each other through at least one of internet communication, optical communication line, electric communication line and wireless communication, a server computer obtains actual condition data of the each of the compressors through the at least one of internet communication, optical communication line, electric communication line and wireless communication, and stores therein the obtained actual condition data and predetermined database to be compared with the obtained actual condition data to find a remarkable technical point in the compressor, and a service center computer outputs the remarkable technical point to at least one of a service person and the compressor so that the at least one of the service person, the compressor and the user of the compressor can handle appropriately the remarkable technical point in the compressor.

18 Claims, 3 Drawing Sheets

COMPRESSOR REMOTE MONITORING SYSTEM

BACKGROUND OF THE INVENTION AND RELATED ART STATEMENT

The present invention relates to a system for monitoring each of compressors distant from each other through at least one of internet communication, optical communication line, electric communication line and wireless communication.

In a monitoring device for air conditioner as disclosed by JP-A-2001-141290, operation data of refrigerating cycle and maintenance data of the refrigerating system stored in a control device and an alarm signal generated by the control device are edited along a predetermined format and subsequently converted to HTML file data to be transmitted out of the monitoring device through telephone line.

OBJECT AND SUMMARY OF THE INVENTION

An object of the present invention is to provide a system for monitoring each of compressors distant from each other through at least one of internet communication, optical communication line, electric communication line and wireless communication, by which system a service person or the compressor can handle appropriately a remarkable technical point in the compressor.

A system for monitoring each of compressors distant from each other through at least one of internet communication, optical communication line, electric communication line and wireless communication, according to the present invention, comprises, a server computer for obtaining actual condition data of the each of the compressors through the at least one of internet communication, optical communication line, electric communication line and wireless communication, and storing therein the obtained actual condition data and predetermined database to be compared with the obtained actual condition data to find a remarkable technical point in the compressor, and a service center computer for outputting the remarkable technical point to at least one of a service person, the compressor and the user of the compressor (by printed matter, an indication on the service computer display, an indication on a user computer display, a control signal for the compressor or the like) so that the at least one of the service person, the compressor and the user of the compressor can handle appropriately the remarkable technical point in the compressor.

Since the remarkable technical point found by comparing the obtained actual condition data with the stored predetermined database is output to the at least one of the service person, the compressor and the user of the compressor so that the at least one of the service person, the compressor and the user of the compressor can handle appropriately the remarkable technical point in the compressor, correct handling of a trouble in the compressor can be securely performed by the service person or the compressor itself, even if the service person is not sufficiently skilled for handling correctly the trouble.

It seems advisable for easily identifying the compressor from which the problem is found that the server computer is operable to obtain, together with the actual condition data, compressor reference data of the each of the compressors to identify the compressor from which the actual condition data is obtained, and the service center computer is operable to output to the at least one of the service person, the compressor and the user of the compressor, together with the remarkable technical point, the compressor reference data for identifying the compressor from which the remarkable technical point is found.

It seems advisable for securely finding the problem that the server computer is operable to obtain the actual condition data at predetermined time intervals. It seems advisable for further securely finding the problem that the server computer is operable to obtain and store the actual condition data at time intervals changeable in accordance with a value of a deviation of the previously obtained actual condition data in comparison with the predetermined database (when the value of the deviation, for example, a difference between the previously obtained actual condition data and the predetermined database becomes smaller, the time interval is made shorter) and/or the server computer is operable to obtain the actual condition data instantly after the actual condition data is generated if the actual condition data is a kind of emergency, for example, the actual condition data shows an operation of circuit breaker by excessive electric current in the compressor, an operation of excessive heat temperature sensor in the compressor, an operation of emergency stop switch by a person in a user's plant or the like.

If the system comprises a plurality of the service center computers, it is preferable that one of the service center computers is selected in accordance with the compressor reference data to output the remarkable technical point together with the compressor reference data to the at least one of the service person, the compressor and the user of the compressor so that the at least one of the service person suitable for the compressor identified by the compressor reference data and the compressor identified by the compressor reference data can handle the remarkable technical point in the compressor.

The predetermined database may compared with the obtained actual condition data to find the remarkable technical point by desired one of the service center computer and the server computer. The service center computer is operable to output the remarkable technical point to the compressor so that the compressor can be controlled in accordance with the remarkable technical point, and/or to output the remarkable technical point to the service person so that at least one of an exchange of a part of the compressor and a repair of the part of the compressor can be brought about on the basis of the remarkable technical point by the service person. The actual condition data stored in the server computer may be a changing manner of the actual condition of a part of the compressor along a time passage.

It is preferable for the server computer to, at predetermined time intervals, compare the stored actual condition data with the predetermined database to find the remarkable technical point and outputs the remarkable technical point to the service center computer. The predetermined database may include threshold data to be compared with the obtained actual condition data for determining whether or not at least one of an operation stop of the compressor by the compressor itself, an exchange of a part of the compressor and a repair of the part of the compressor is necessary.

When the predetermined database includes a typical changing manner of the condition of a part of the compressor along a time passage from a normal or non-problem condition to an abnormal or not-usable condition as obtained by experimentally or from the previously actually obtained typical changing manners of the conditions of the parts of the compressors along the time passage from the normal or non-problem condition to the abnormal or not-usable condition, and at least one of the server computer and the service center computer calculates an estimated remaining life term of the part of the compressor by comparing the typical changing manner of the condition of the compressor with the obtained actual condition data, that is, from the difference therebetween and a rate in decrease of the difference along the time passage. At least one of the server computer and the service center computer may estimate a cost for at least one of the exchange of the part of the compressor and the repair of the part of the compressor and the timing suitable for the at least one of the exchange of the part of the compressor and the repair of the part of the compressor by comparing the predetermined database with the obtained actual condition data.

The server computer may output directly without passing through the service center computer to the compressor an instruction signal for controlling the compressor by comparing the predetermined database with the obtained actual condition data. The server computer may output an instruction signal for instructing a compressor manufacturing factory to produce a substitute compressor for the compressor by comparing the predetermined database with the obtained actual condition data. When one of the user's plants includes a plurality of the compressors, the server computer may output an instruction signal for controlling each of the compressors in the one of the user's plants so that which of the compressors needs to be operated in the one of the user's plants is determined by comparing the predetermined database with the obtained actual condition data. The remarkable technical point may include an information regarding at least one of a trouble of the compressor, a trouble of a part of the compressor, a necessity of repair of the part of the compressor, a necessity of exchange of the part of the compressor for an alternative part of the compressor, a necessity of exchange of the compressor for an alternative compressor, and so forth.

Other objects, features and advantages of the invention will become apparent from the following description of the embodiments of the invention taken in conjunction with the accompanying drawings.

DETAILED DESCRIPTION OF PREFERRED EMBODIMENTS

Figure 1:
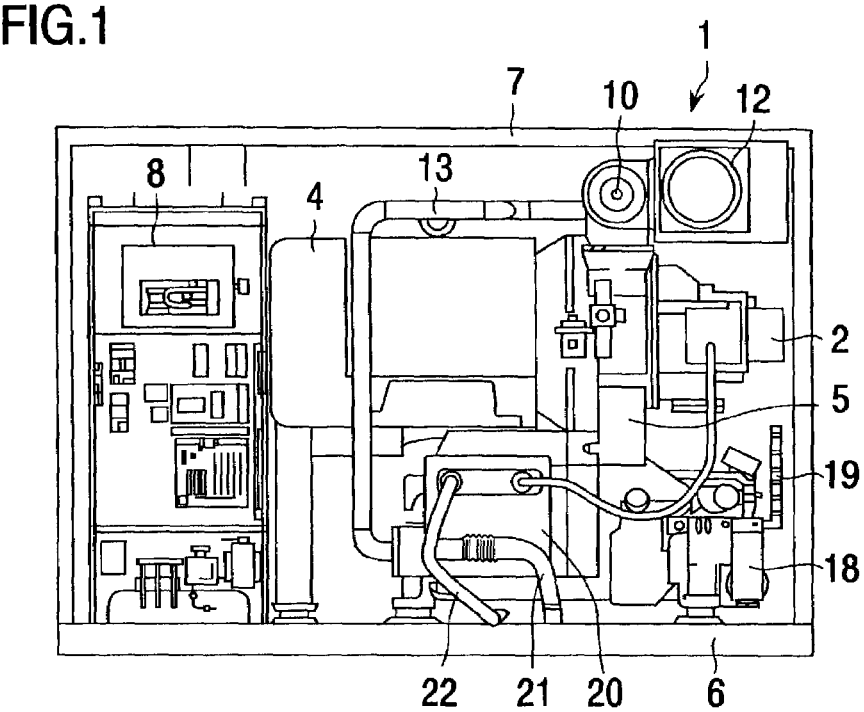
FIG. 1 is a front view of a compressor suitable for a compressor remote monitoring system of the invention.
Figure 2:
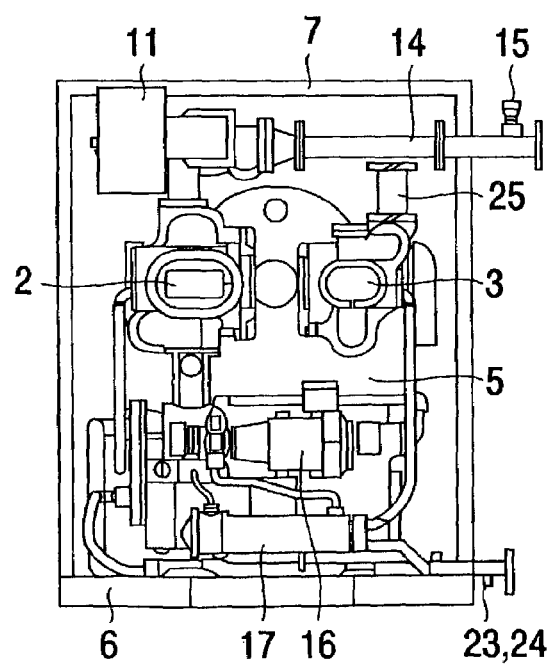
FIG. 2 is a side view of the compressor.
Figure 3:
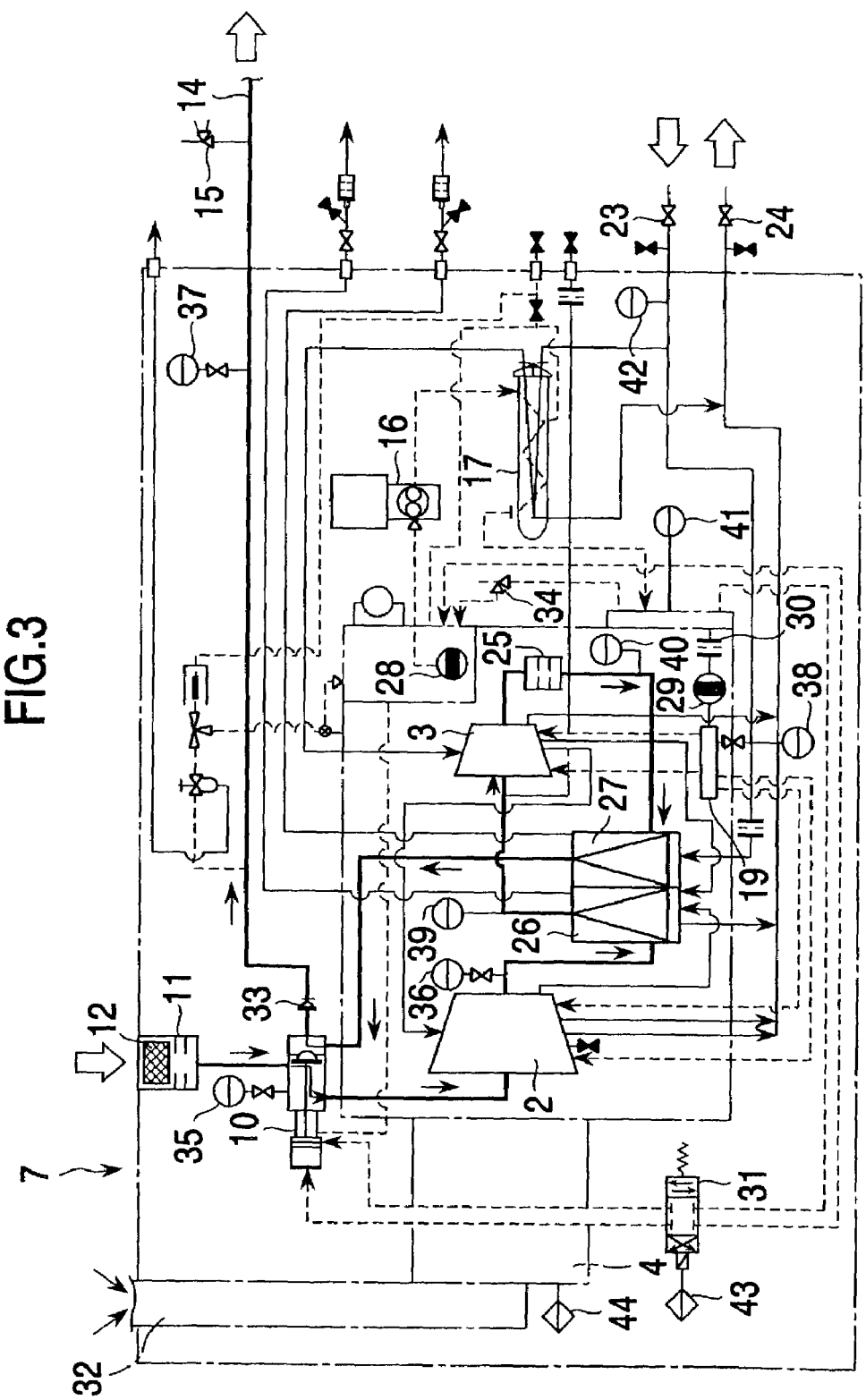
FIG. 3 is a schematic view of line arrangement for working gas, refrigerant water, lubricant and so forth in the compressor.

A package type screw compressor 1 for compressing air without a lubricant between screw rotors includes a low pressure stage compressor 2 of output pressure 0.2–0.35 MPa (gage pressure) and a high pressure stage compressor 3 of output pressure 0.7–1.0 MPa (gage pressure). The low pressure stage compressor 2 and high pressure stage compressor 3 are fixed to a set-up gear casing 5 by bolts, and an electric motor 4 is arranged in the a set-up gear casing 5 at a side opposite to the low pressure stage compressor 2 and high pressure stage compressor 3. Each of the low pressure stage compressor 2 and high pressure stage compressor 3 has a pair of female and male screw rotors whose horizontal axes are at the same height as a height of an output shaft of the motor 4. The male screw rotor of each of the low pressure stage compressor 2 and high pressure stage compressor 3 is driven by the output shaft of the motor 4 while the female screw rotor of each of the low pressure stage compressor 2 and high pressure stage compressor 3 is driven through a pair of timing gears by the male screw rotor of each of the low pressure stage compressor 2 and high pressure stage compressor 3 through a pair of timing gears rotationally fixed to respectively the male and female rotors to rotate synchronously with each other. An oil tank is formed at a bottom of the set-up gear casing 5.

An oil cooler 17 and an oil pump 16 are attached to a side surface of the oil tank, and a lubricant oil for the low pressure stage compressor 2 and high pressure stage compressor 3 is introduced into the oil pump 16 through a primary oil strainer 28 from the oil tank. The lubricant oil pumped by the oil pump 16 is cooled by an oil cooler 17, and a part of the lubricant oil is fed to a relief valve 34 and an electromagnetic valve 31. Another part of the lubricant oil is regulated in pressure by an orifice 30, and introduced into a manifold 19 through an oil filter 29. The lubricant oil is distributed from the manifold 19 to lubricating portions in the low pressure stage compressor 2 and high pressure stage compressor 3.

An intercooler 26 for cooling the working gas for the low pressure stage compressor 2 and an inter-cooler 27 for cooling the working gas for the high pressure stage compressor 3 are juxtaposed with each other, and a common casing receives therein both the inter-coolers 26 and 27 while the common casing is formed monolithically with the set-up gear casing 5. A cover plate 20 of the common casing is connected to a water supply pipe 22 and a water discharge pipe 21.

A capacity adjusting valve 10 is arranged at an upper portion of the set-up gear casing 5 in the vicinity of the low pressure stage compressor 2. An intake duct 11 with an intake filter therein is attached to the capacity adjusting valve 10, and an intake throttle, a relief valve and a check valve is formed in the capacity adjusting valve 10. The intake throttle and the relief valve are formed at an end of a piston movable in the capacity adjusting valve 10.

A steel discharge pipe 13 connects an after-cooler 27 to an upstream side of a check valve 33 mounted on the capacity adjusting valve 10. A steel discharge pipe 14 is connected to a secondary side of the check valve 33 and extends through a compressor soundproof cover to an outside of the package. A flange portion of an end of the discharge pipe 14 is connected to a flange portion of an end of an intake pipe to which the compressed air is supplied. A safety valve 15 is arranged at an intermediate portion of the discharge pipe 14.

The monolithic casing and a base on which the screw compressor is mounted is covered by a sound proof cover panel 7 including at inner surface thereof sound absorbing material such as glass-wool. At this stage, a production of the package type screw compressor 1 is completed. The sound proof cover panel 7 at the top of the package has a cooling air intake opening. An end of the output shaft of the motor has a rotational fin for urging the air from the cooling air intake opening to an inlet duct 32 for cooling the motor. The sound proof cover panel 7 has also an air discharge opening.

The air as the working gas in the package type screw compressor 1 taken from the atmosphere flows, during a normal on-load operation, into an intake filter 12 in the intake duct 11 to remove dust from the air. Subsequently, the air flows into the low pressure stage compressor 2 through the capacity adjusting valve 10. The air pressurized to about 0.25 MPa by the low pressure stage compressor 2 while being heated to about 150° C. is fed to the inter-cooler 26 to be cooled 30–40° C., and subsequently proceeds into the high pressure stage compressor 3.

The air is pressurized to about 0.7–1.0 MPa by the high pressure stage compressor 3 while being heated to about 150–200° C. thereby. A sound of the air flowing out of the high pressure stage compressor 3 is absorbed by a discharge silencer 25. Thereafter the discharged air is cooled to 30–40° C. by the after-cooler 27. The pressurized gas after being cooled is fed through the check valve 33 to a plant apparatus as the pressurized gas user.

When the operation of the compressor is switched to unload operation, the piston of the capacity adjusting valve 10 is moved to throttle the intake air and open the relief valve so that the pressurized gas is discharged from the high pressure stage compressor 3 to the atmosphere through the intake duct 11. Since the intake throttle valve throttles the intake air during the unload operation, an intake pressure of the low pressure stage compressor 2 is vacuumed to about 0.01 MPa, and a discharge pressure of the high pressure stage compressor 3 becomes about 0.1 MPa slightly greater than the atmospheric pressure.

A cooler-nest of heat-exchanger is incorporated into each of the inter-cooler 26 and the after-cooler 27. The pressurized air discharged from the high pressure stage compressor 3 or the low pressure stage compressor 2 flows into an upper portion of the coolers and passes through the cooler-nest in the coolers to be cooled by heat exchange by a cooling water flowing in rectangular cross section passage of the cooler. For example, the pressurized air flowing out of the low pressure stage compressor 2 is cooled from 150° C. to about 40° C. by the inter-cooler 26, and subsequently proceeds into the high pressure stage compressor 3.

Water vapor in the pressurized gas is liquefied when being cooled by the inter-cooler 26 and the after-cooler 27, so that a drain water is formed. The drain water formed in the inter-cooler 26 drops to a bottom of the inter-cooler 26 and is discharged from the bottom of the intake path of the high pressure stage compressor 3 to the outside of the compressor.

A maintenance door is attached to a front side of the sound proof cover panel 7, and a control panel 8 is arranged adjacently to the maintenance door at an inside of the sound proof cover panel 7. The control panel 8 includes a memory device of data necessary for controlling the compressor, and includes at lower portion thereof, sensors and pressure switches for protecting the compressor and generating alarm signals, the electromagnetic valve 31, and so forth. The air pipe, oil pipe and cooling water pipe has pressure sensors and temperature sensors thereon to measure pressures and temperatures on various parts of the compressor.

The intake air pressure of the low pressure stage compressor 2, the outlet pressure of the low pressure stage compressor 2 (compressor intermediate pressure), the outlet pressure of the high pressure stage compressor 3 and the pressure of the lubricant oil are measured respectively at a pressurized portion 35 at the inlet of the low pressure stage compressor 2 in the capacity adjusting valve 10, a pressurized portion 36 at the outlet of the low pressure stage compressor 2, at the air discharge pipe 14 after passing the check valve 33, and at the manifold 38.

When the intake air pressure of the low pressure stage compressor 2 is decreased to a predetermined value, the intake filter 12 is contaminated. Therefore, when the intake air pressure of the low pressure stage compressor 2 as the claimed actual condition data is decreased to not more than −6 kPa, it is known therefrom that the intake filter is clogged by the contamination, and an alarm signal as the claimed remarkable technical point for showing that a filter cleaning is necessary is generated.

When the outlet pressure of the low pressure stage compressor 2 (compressor intermediate pressure) increases to a predetermined value, a compression performance of the high pressure stage compressor 3 decreases because of wearing of the rotor(s). Therefore, when the outlet pressure of the low pressure stage compressor 2 (compressor intermediate pressure) as the claimed actual condition data increases to the predetermined value, for example, not less than 250 kPa, it is known therefrom that the compression performance of the high pressure stage compressor 3 decreases or the wearing of the rotor(s) occurs, and an alarm and/or instruction signal as the claimed remarkable technical point for showing that an operation stop of the compressor by the compressor itself is necessary is generated.

When the outlet pressure of the high pressure stage compressor 3 as the claimed actual condition data as the claimed actual condition data increases to the predetermined value, for example, not less than 71 kPa as the upper limit output pressure, an instruction signal as the claimed remarkable technical point for showing that unload operation of the compressor is ordered is generated. When the outlet pressure of the high pressure stage compressor 3 as the claimed actual condition data decreases to the predetermined value, for example, not more than 66 kPa as the lower limit output pressure, an instruction signal as the claimed remarkable technical point for showing that on-load operation of the compressor is ordered is generated.

When the pressure of the lubricant oil to be supplied into the compressor decreases, the oil filter 29 is contaminated or clogged, or an amount of the lubricant oil is insufficient. Therefore, when the pressure of the lubricant oil to be supplied into the compressor as the claimed actual condition data decreases to the predetermined value, for example, not more than 90 kPa, an alarm and/or instruction signal as the claimed remarkable technical point for showing that an operation stop of the compressor by the compressor itself and/or an exchange of the oil filter is necessary is generated.

The outlet air temperature of the inter-cooler 26, the outlet air temperature of the high pressure stage compressor 3 (inlet air temperature of the after-cooler 27), the temperature of the lubricant oil to be supplied into the compressor, and the temperature of the cooling water to be supplied to the cooler are measured respectively by sensors 39–42 at an inlet 39 of the inter-cooler 26, an outlet 40 of the high pressure stage compressor 3, an outlet 41 of the oil cooler, and inlet 42 of the cooling water passage.

When the outlet air temperature of the inter-cooler 26 increases, a cooling performance of the inter-cooler 26 is decreased by contamination thereof and/or an insufficient amount of the cooling water. Therefore, when the outlet air temperature of the inter-cooler 26 as the claimed actual condition data increases to the predetermined value, for example not less than 50° C., an alarm and/or instruction signal as the claimed remarkable technical point for showing that an operation stop of the compressor by the compressor itself and/or a cleaning of the cooler is necessary is generated.

When the outlet air temperature of the high pressure stage compressor 3 increases, an amount of the cooling water in the compressor is insufficient. Therefore, when the outlet air temperature of the high pressure stage compressor 3 as the claimed actual condition data increases to the predetermined value, for example, not less than 190° C., an alarm and/or instruction signal as the claimed remarkable technical point for showing that an operation stop of the compressor by the compressor itself and/or an additional supply of the cooling water is necessary is generated.

When the temperature of the lubricant oil to be supplied into the compressor increases, the oil cooler 17 is contaminated or an amount of the cooling water in the oil cooler is insufficient. Therefore, when the temperature of the lubricant oil to be supplied into the compressor as the claimed actual condition data increases to the predetermined value, for example, not less than 55, an alarm and/or instruction signal as the claimed remarkable technical point for showing that an operation stop of the compressor by the compressor itself, a cleaning of the oil cooler 17 and/or an additional supply of the cooling water is necessary is generated.

When the temperature of the cooling water to be supplied to the cooler increases, a cooling performance of at least one of the air cooler, oil cooler 17 and compressor decreases. Therefore, when the temperature of the cooling water to be supplied to the cooler as the claimed actual condition data increases to the predetermined value, for example, not less than 42, an alarm and/or instruction signal as the claimed remarkable technical point for showing that an operation stop of the compressor by the compressor it self is necessary is generated.

The electromagnetic valve 31 includes a switching total number counter 43 for counting a total number of switching between load-operation cycle and unload-operation cycle of the compressor. When the counted total number of the unload-operation cycles as the claimed actual condition data reaches the predetermined value, an alarm and/or instruction signal as the claimed remarkable technical point for showing that the exchange and/or repair of the part of the compressor is necessary is generated.

Figure 4:
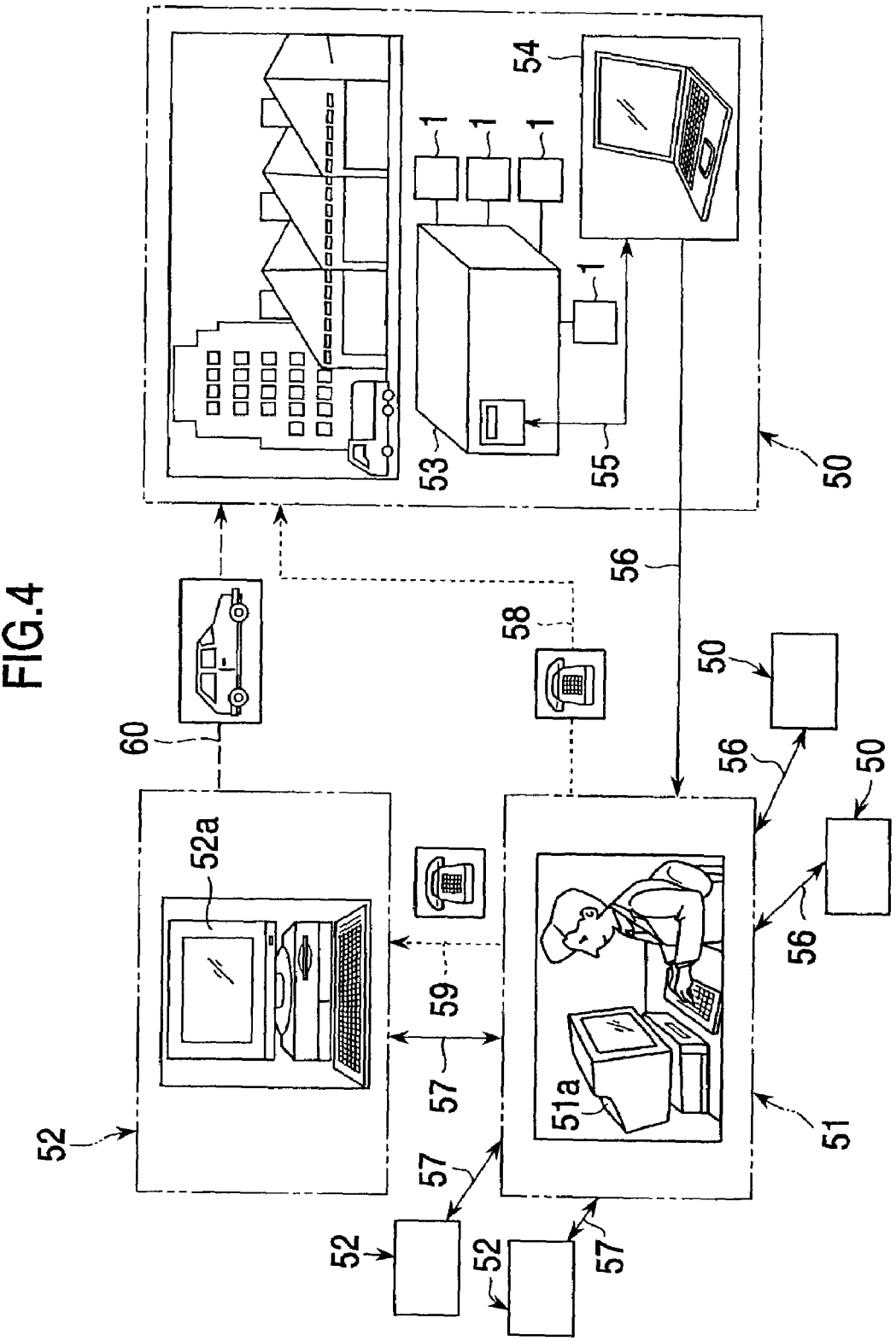
FIG. 4 is a schematic view of an embodiment of the compressor remote monitoring system of the invention.

The motor 4 includes an operating time period counter 44 for counting a total time period in which the compressor is driven. When the total time period as the claimed actual condition data reaches the predetermined value, an alarm and/or instruction signal as the claimed remarkable technical point for showing that the exchange and/or repair of the part of the compressor is necessary is generated. As shown in FIG. 4, these measured data of operating time period, switching number, temperatures, pressures and so forth in a user's plant 50 are stored in the memory of the control device 53 of the compressor and subsequently in a server computer 51a in a remote monitoring center 51 through a communication line 55, a user computer 54, at least one of internet communication, optical communication line, electric communication line and wireless communication denoted by 56.

Transmittal of each of these measured data to the server computer 51a is brought about at predetermined time intervals or time intervals changeable in accordance with a value of a deviation of the previously measured data in comparison with the predetermined value. The measured data may be transmitted to the server computer 51a instantly after the measured data is generated if the measured data indicates a kind of emergency such as a large possibility of significant damage of the compressor.

When the measured data of the kind of emergency is transmitted into the server computer 51a, the server computer 51a outputs, through at least one of internet communication, optical communication line, electric communication line and wireless communication denoted by 57, the measured data to a service center computer 52a in a maintenance service center 52 suitable for handling the compressor from which the measured data is generated. If a plurality of the maintenance service centers 52 are arranged at respective various local points, one of the service center computers 52a in the maintenance service centers 52 suitable for handling the compressor from which the measured data is generated is selected by the server computer 51a in accordance compressor reference data attached to the measured data. The compressor reference data corresponds to the each of the compressors and is attached to the measured data to identify the compressor from which the measured data is obtained. The selected service center computer 52a outputs to at least one of a service person and the compressor, together with the alarm and/or instruction signal, the compressor reference data for identifying the compressor from which the alarm and/or instruction signal is found. The server computer may directly outputs to the compressor, together with the alarm and/or instruction signal, the compressor reference data. Therefore, the at least one of the service person suitable for the compressor identified by the compressor reference data and the compressor identified by the compressor reference data can handle the alarm and/or instruction signal in the compressor.

The comparison between the measured data and the predetermined value for determining the alarm and/or instruction signal may be performed by either of the server computer 51a and the service center computer 52a. The communication between an operator of the server computer sowing the alarm and/or instruction signal and the user may be performed by telephone line 58, and the communication between the operator of the server computer sowing the alarm and/or instruction signal and the service person in the maintenance service center may be performed by telephone line 59. The service person goes to the user's plant on the basis of the alarm and/or instruction signal as denoted by 60.

If the measured data is not of the kind of emergency, the alarm and/or instruction signal for suitable exchange, repair or additional supply of the part of the compressor without emergency stop of the compressor by the compressor itself may be determined at predetermined time intervals, for example, every day or month, on the basis of the comparison between the measured data and the predetermined value by either of the server computer 51a and the service center computer 52a as follows. The issue of alarm and/or instruction signal may be reported to the user.

When the measured data as the claimed actual condition data stored in the server computer 51a includes a changing manner of the measured value of actual condition along a time passage (a time passage=a time passage of the absolute time proceeding or a time passage of the compressor driven time amount), the predetermined value as the claimed predetermined database stored in the server computer 51a includes a typical changing manner of the condition value of the compressor along a time passage (obtained or determined from previously obtained various measured data) from a normal or non-problem condition of the compressor to an abnormal or troubled condition of the compressor, and it is know by either of the server computer 51a and the service center computer 52a that a difference between the changing manner of the measured value of actual condition along the time passage and the typical changing manner of the condition value of the compressor along the time passage decreases to a predetermined degree, for example, zero or a suitably determined degree, along the time passage, the service center computer 52a outputs the alarm or instruction signal for showing that the exchange, additional supply and/or repair of the part of the compressor is necessary now or will be necessary in the near future to at least the service person, preferably both the service person and the user of the compressor. As a matter of course, the alarm or instruction signal may be output when the measured data reaches the predetermined value, or a difference between the measured data and the predetermined value becomes a predetermined degree. The server computer 51a or the service center computer 52a may calculate an estimated remaining life term of the part of the compressor by comparing the typical changing manner of the condition value of the compressor with the measured actual condition value.

If a plurality of the compressors are used in the user's plant, the operation of each of the compressor may be controlled on the basis of the measured actual condition data in such a manner that differences among total driven time periods of the compressors become as small as possible, which compressor(s) needs to be operated is determined for minimizing the operation cost of the compressors, and/or the compressor of the minimum estimated remaining life term of the part thereof is stopped. The compressor of a relatively low rate of operation is known from the measured actual condition data so that the compressor of a relatively low rate of operation can be sold through the internet communication.

The predetermined values, the typical changing manner of the condition values along the time passage, and so forth to be with the measured condition data, the measured actual condition values, the changing manners of the measured values of actual condition along the time passage to determine the alarm or instruction signal form the claimed stored predetermined data base.

The user's merit brought about by the present invention is as follows:
(1) An abrupt trouble can be escaped by the estimation of the remaining life term of the part of the compressor.
(2) An accuracy of the estimation of the remaining life term of the part of the compressor is improved so that a total usable operating time period is made long and the maintenance cost is decreased.
(3) Quick response to the abrupt trouble can be performed.
(4) Maintenance works can be decreased.
(5) Economic operation of the compressor on the basis of the analysis of the measured actual condition data can be performed.

The service provider's merit brought about by the present invention is as follows:
(1) An emergency action of the service person is prevented because the abrupt trouble can be escaped by the estimation of the remaining life term of the part of the compressor.
(2) A timing and cost of exchange of the part of the compressor and/or repair thereof can be estimated correctly from the previously obtained condition data of the compressor.
(3) Suggestion to the user for economic operation of the compressor can be obtained from the obtained condition data of the compressor.
(4) Correct handling of the trouble by the service person can be performed if the service person is not sufficiently skilled in the trouble, because the instruction for appropriate handling of the trouble is output from the service center computer.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A system for monitoring a compressor in each of user's plants distant from each other through at least one of internet communication, optical communication line, electric communication line and wireless communication, comprising
a server computer for obtaining actual condition data of the each of the compressors through the at least one of internet communication, optical communication line, electric communication line and wireless communication, and storing therein the obtained actual condition data and predetermined database to be compared with the obtained actual condition data to find a remarkable technical point in the compressor, and
a service center computer for outputting the remarkable technical point to at least one of a service person, the compressor and a user of the compressor so that the at least one of the service person, the compressor and the user of the compressor can handle appropriately the remarkable technical point in the compressor,
wherein the service center computer is operable to output the remarkable technical point to the compressor so that the compressor can be controlled in accordance with the remarkable technical point.

2. A system according to claim 1, wherein the server computer is operable to obtain, together with the actual condition data, compressor reference data of the each of the compressors to identify the compressor from which the actual condition data is obtained, and the service center computer is operable to output to the at least one of the service person, the compressor and the user of the compressor, together with the remarkable technical point, the compressor reference data for identifying the compressor from which the remarkable technical point is found.

3. A system according to claim 2, wherein the system comprises a plurality of the service center computers, and one of the service center computers is selected in accordance with the compressor reference data to output the remarkable technical point together with the compressor reference data to the at least one of the service person, the compressor and the user of the compressor so that the at least one of the service person suitable for the compressor identified by the compressor reference data and the compressor identified by the compressor reference data can handle the remarkable technical point in the compressor.

4. A system according to claim 1, wherein the server computer is operable to obtain the actual condition data at predetermined time intervals.

5. A system according to claim 1, wherein the server computer is operable to obtain and store the actual condition data instantly after the actual condition data is generated if the actual condition data is a kind of emergency.

6. A system according to claim 1, wherein the predetermined database is compared with the obtained actual condition data to find the remarkable technical point by at least one of the service center computer and the server computer.

7. A system according to claim 1, wherein the service center computer is operable to output the remarkable technical point to the service person so that at least one of an exchange of a part of the compressor and a repair of the part of the compressor can be brought about on the basis of the remarkable technical point by the service person.

8. A system according to claim 1, wherein the actual condition data stored in the server computer includes a changing manner of the actual condition along a time passage.

9. A system according to claim 1, wherein the server computer compares the stored actual condition data with the predetermined database to find the remarkable technical point and outputs the remarkable technical point to the service center computer at predetermined time intervals.

10. A system according to claim 1, wherein the predetermined database includes threshold data to be compared with the obtained actual condition data for determining whether or not at least one of an operation stop of the compressor, an exchange of a part of the compressor and a repair of the part of the compressor is necessary.

11. A system according to claim 1, wherein the predetermined database includes a typical changing manner of the condition of the compressor along a time passage, and at least one of the server computer and the service center computer calculates an estimated remaining life term of a part of the compressor by comparing the typical changing manner of the condition of the compressor with the obtained actual condition data.

12. A system according to claim 1, wherein at least one of the server computer and the service center computer estimates a cost for at least one of an exchange of a part of the compressor and a repair of the part of the compressor and a timing suitable for the at least one of the exchange of the part of the compressor and the repair of the part of the compressor by comparing the predetermined database with the obtained actual condition data.

13. A system according to claim 1, wherein, when one of the user's plants includes a plurality of the compressors, the server computer is operable to output an instruction signal for controlling each of the compressors in the one of the user's plants so that which of the compressors needs to be operated in the one of the user's plants is determined by comparing the predetermined database with the obtained actual condition data.

14. A system according to claim 1, wherein the remarkable technical point includes an information regarding at least one of a trouble of the compressor, a trouble of a part of the compressor, a necessity of repair of the part of the compressor, a necessity of exchange of the part of the compressor for an alternative part of the compressor, and a necessity of exchange of the compressor for an alternative compressor.

15. A system for monitoring a compressor in each of user's plants distant from each other through at least one of internet communication, optical communication line, electric communication line and wireless communication, comprising a server computer for obtaining actual condition data of the each of the compressors through the at least one of internet communication, optical communication line, electric communication line and wireless communication, and storing therein the obtained actual condition data and predetermined database to be compared with the obtained actual condition data to find a remarkable technical point in the compressor, and a service center computer for outputting the remarkable technical point to at least one of a service person, the compressor and a user of the compressor so that the at least one of the service person, the compressor and the user of the compressor can handle appropriately the remarkable technical point in the compressor, wherein the server computer is operable to obtain and store the actual condition data at time intervals changeable in accordance with a value of a deviation of the previously obtained actual condition data in comparison with the predetermined database.

16. A system according to claim 15, wherein, the smaller the value of the deviation is, the shorter the time interval is.

17. A system for monitoring a compressor in each of user's plants distant from each other through at least one of internet communication, optical communication line, electric communication line and wireless communication, comprising a server computer for obtaining actual condition data of the each of the compressors through the at least one of internet communication, optical communication line, electric communication line and wireless communication, and storing therein the obtained actual condition data and predetermined database to be compared with the obtained actual condition data to find a remarkable technical point in the compressor, and a service center computer for outputting the remarkable technical point to at least one of a service person, the compressor and a user of the compressor so that the at least one of the service person, the compressor and the user of the compressor can handle appropriately the remarkable technical point in the compressor, wherein the server computer is operable to output directly without passing through the service center computer to the compressor an instruction signal for controlling the compressor by comparing the predetermined database with the obtained actual condition data.

18. A system for monitoring a compressor in each of user's plants distant from each other through at least one of internet communication, optical communication line, electric communication line and wireless communication, comprising a server computer for obtaining actual condition data of the each of the compressors through the at least one of internet communication, optical communication line, electric communication line and wireless communication, and storing therein the obtained actual condition data and predetermined database to be compared with the obtained actual condition data to find a remarkable technical point in the compressor, and a service center computer for outputting the remarkable technical point to at least one of a service person, the compressor and a user of the compressor so that the at least one of the service person, the compressor and the user of the compressor can handle appropriately the remarkable technical point in the compressor, wherein the server computer is operable to output an information for instructing a compressor producing factory to produce a substitute compressor for the compressor by comparing the predetermined database with the obtained actual condition data.

* * * * *